United States Patent
Saunders et al.

(10) Patent No.: US 10,070,342 B2
(45) Date of Patent: Sep. 4, 2018

(54) MEASUREMENT DENOISING

(71) Applicant: Apple Inc., Cupertino, CA (US)

(72) Inventors: Steven E. Saunders, Cupertino, CA (US); Alexandros Michael Tourapis, Milpitas, CA (US); Krasimir Kolarov, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/186,138

(22) Filed: Jun. 17, 2016

(65) Prior Publication Data
US 2016/0373960 A1    Dec. 22, 2016

Related U.S. Application Data

(60) Provisional application No. 62/182,374, filed on Jun. 19, 2015.

(51) Int. Cl.
| | |
|---|---|
| *H04W 28/04* | (2009.01) |
| *H04L 12/26* | (2006.01) |
| *H04W 52/02* | (2009.01) |
| *G06F 1/32* | (2006.01) |
| *H04N 19/85* | (2014.01) |
| *H04N 19/44* | (2014.01) |

(52) U.S. Cl.
CPC .......... *H04W 28/04* (2013.01); *G06F 1/3212* (2013.01); *H04L 43/16* (2013.01); *H04N 19/85* (2014.11); *H04W 52/0277* (2013.01); *H04N 19/44* (2014.11); *Y02D 70/00* (2018.01)

(58) Field of Classification Search
CPC ........ H04W 28/06; H04L 43/16; G06T 5/002; Y02B 60/50; H04N 5/357
See application file for complete search history.

(56) References Cited

U.S. PATENT DOCUMENTS

| | | | | |
|---|---|---|---|---|
| 6,012,031 | A * | 1/2000 | Oliver | H03H 17/026 704/500 |
| 2001/0027382 | A1* | 10/2001 | Jarman | H01J 49/0036 702/179 |
| 2004/0223569 | A1* | 11/2004 | Hagen | G01R 31/3177 375/355 |
| 2005/0058301 | A1* | 3/2005 | Brown | G10L 21/0208 381/94.2 |
| 2006/0155476 | A1* | 7/2006 | Abma | G01V 1/28 702/14 |
| 2008/0129367 | A1 | 6/2008 | Murata et al. | |
| 2011/0131189 | A1* | 6/2011 | Mangano | G06F 5/06 707/701 |

OTHER PUBLICATIONS

Steven W. Smith; "Digital Signal Processing: A Practical Guide for Engineers and Scientists"; Demystifying Technology Series; 2003; 84 pages.

(Continued)

*Primary Examiner* — Aristocratis Fotakis
(74) *Attorney, Agent, or Firm* — Baker & Hostetler LLP; Robert L. Hails (57) ABSTRACT

A method includes sampling a common signal over a plurality of iterations, concatenating the sampled iterations, summing samples of the concatenated iterations within a window of a predetermined sample width, at each of a plurality of window positions along the concatenated iterations, and estimating noise of the common signal from the summed sample values at the window positions.

30 Claims, 8 Drawing Sheets

(56) References Cited

OTHER PUBLICATIONS

Steven W. Smith; "Digital Signal Processing: A Practical Guide for Engineers and Scientists"; Demystifying Technology Series; 2003; 168 pages (part two).
Steven W. Smith; "Digital Signal Processing: A Practical Guide for Engineers and Scientists"; Demystifying Technology Series; 2003; 168 pages (part three).
Steven W. Smith; "Digital Signal Processing: A Practical Guide for Engineers and Scientists"; Demystifying Technology Series; 2003; 84 pages (part four).
Steven W. Smith; "Digital Signal Processing: A Practical Guide for Engineers and Scientists"; Demystifying Technology Series; 2003; 100 pages (part five).
Steven W. Smith; "Digital Signal Processing: A Practical Guide for Engineers and Scientists"; Demystifying Technology Series; 2003; 62 pages (part six).
Nithi et al.; "Smart Power Management for Mobile Handsets"; Bell Labs Technical Journal; vol. 15 No. 4; Mar. 2011; p. 149-168.
Hodgson et al.; "Properties, implementations and applications of rank filters"; Image and Vision Computing; vol. 3 No. 1; Feb. 1985; p. 3-14.
International Patent Application No. PCT/US2016/038213; Int'l Search Report and the Written Opinion; dated Jan. 4, 2017; 23 pages.
International Patent Application No. PCT/US2016/038213; Int'l Preliminary Report on Patentability; dated Dec. 28, 2017; 16 pages.

\* cited by examiner

MEASUREMENT DENOISING

CLAIM FOR PRIORITY

This application benefits from priority of application Ser. No. 62/182,374, filed Jun. 19, 2015 and entitled "Measurement Denoising," the disclosure of which is incorporated herein in its entirety.

BACKGROUND

The present disclosure relates to identifying and removing additive noise from a measurement of a signal. More specifically, the present disclosure relates to removing noise by running a plurality of instances of a signal, making a measurement for each instance, and analyzing the measurements to obtain a signal with noise removed therefrom. For example, the methods and systems of the present disclosure may measure power consumption, improve accuracy of a power consumption measurement, and identify sources of noise in a power consumption measurement.

There has been considerable interest in achieving power reduction and improving energy efficiency on a variety of applications, such as lighting, car fuel efficiency, as well as various home or office electrical and electronic devices. This is driven by the desire to save on fuel resources, reduce costs, as well as, in the case of mobile devices, prolong battery and usage time. These savings are achieved through the use of more efficient algorithms and software that may run on such systems as well as new material, improved fabrication and design processes and hardware.

This interest extends to mobile devices. There has been a tremendous increase in focus on managing power consumption in the computer and consumer electronics industry both from the design and management perspective. On mobile devices, such as phones and tables, video and in general multimedia applications tend to be among the most power consuming applications and, given their impact to the battery life of such devices, there is considerable desire in better managing and limiting such power consumption. Mobile phones, for example, now may make decisions about performing certain functions, use more efficient displays, and use improved semiconductor device fabrication processes, to save on power. For instance, a device may dynamically switch among a variety of decoding protocols, dim a display, pause a process, etc. when local processing environments favor resource conservation. The Green MPEG movement is a standardization process for improving efficiency of media encoding, decoding, and presentation. For example, in a decoding process, an underlying processor voltage may be adapted based on a frame's complexity to save energy. In an encoding process, a device may automatically code video at a lower resolution and/or lower frame rate to conserve energy. For media presentation, backlight or supply voltage of a display can be adapted to image content to consume less power.

As part of the ongoing effort for new Green MPEG technologies, it was decided that proponents should try to provide power measurement results for their proposals measured on general purpose mobile/CE devices (e.g. phones, tablets, computers etc). Ideally, power measurements would involve the blocks impacted by the proposal, as well as the impact of the proposal to the overall system. However, unfortunately it is unlikely that most proponents would be able to provide block-specific power measurement results, since the characteristics and format factor of such devices does not permit power measurements directly on such blocks. This implies that commonly, only overall system power measurements would be available.

Relying on overall system power measurements from general purpose devices can be inaccurate. Such these devices may run other background applications/services while the desired operations, e.g. video decoding, are taking place. For example, system resources on a mobile device may be used for communication purposes, file management, email checking, or other Operating System (OS) related applications. Such operations although sometimes may be systematic, are more commonly random and cannot be easily predicted. On the other hand, device specific operations that may be indirectly related to the desired operation, e.g. video post-processing and display, would also likely be taking place. All such operations would basically contaminate the overall system power measurements potentially impacting also the analysis of such measurements.

Although it is possible to reduce the impact of some of these factors to the overall power by adjusting some of the settings of the device, including potentially disabling services (e.g. switch to Airplane mode on a mobile device) and setting the display brightness to its lowest setting, all factors cannot be eliminated. Thus, the inventors perceive a need for measuring how much power is consumed by a particular process and determining a level of accuracy of a power consumption measurement.

In other words, the inventors perceived a need to remove noise from or "denoise" a measurement. Although the concepts described herein use the example of measuring power consumption, the concepts apply as well to measurement of other types of signals expected to suffer from noise or interference that would generally increase (or generally decrease) the measurement.

DETAILED DESCRIPTION

This disclosure includes methods for sampling a common signal over a plurality of iterations, concatenating the sampled iterations, summing samples of the concatenated iterations within a window of a predetermined sample width, at each of a plurality of window positions along the concatenated iterations, and estimating noise of the common signal from the summed sample values at the window positions. The described methods allow for measuring the amount of power consumed by a particular process and determining a level of accuracy of a power consumption measurement.

Figure 1:
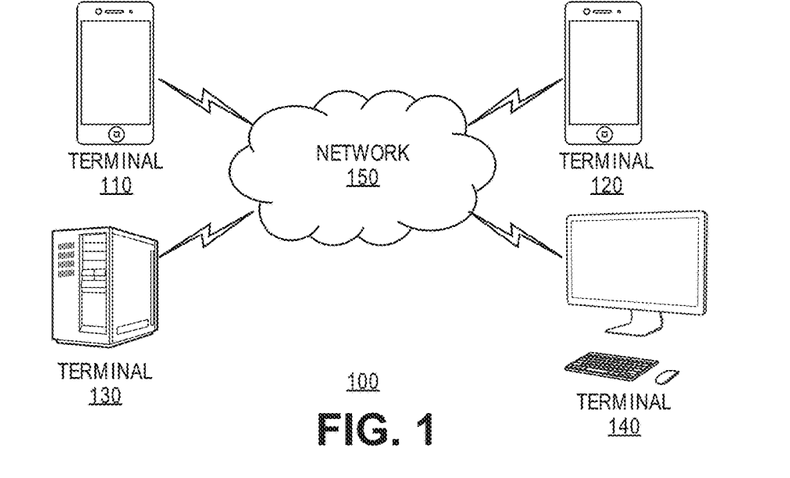
FIG. 1 illustrates a simplified block diagram of a multimedia system according to an embodiment of the present disclosure.

FIG. 1 illustrates a simplified block diagram of a multimedia system 100 according to an embodiment of the present disclosure. The system 100 may include a plurality of terminals 110-140 interconnected via a network 150. Certain terminals may code video data for transmission to another terminal via the network 150. Other terminals may receive the coded video data of the other terminal from the network 150, decode the coded data and consume video data recovered therefrom, typically by displaying the decoded video.

Each of the terminals may consume power to perform coding, receipt, decoding, and display operations. The amount of power consumed by each terminal may be measured by internal circuitry or by external test equipment as further described herein. Power consumption may also be derived by measuring other characteristics of the terminal. For example, one or more sensors may measure: voltages, loads on the circuitry of a terminal, timing to perform various functions, or brightness of a display.

A multimedia system 100 may be used in a variety of applications. In a first application, a pair of terminals 110, 120 may support real time bidirectional exchange of coded video to establish a video conferencing session between them. In another application, a terminal 130 may code pre-produced video (for example, television or movie programming) and store the coded video for delivery to one or, often, many downloading client(s) 140. Thus, the video being coded may be live or pre-produced and it may be distributed in a one-to-one or one-to-many distribution model. For the purposes of the present discussion, the type of video and the video distribution schemes are immaterial unless otherwise noted.

In FIG. 1, the terminals 110-140 are illustrated as smart phones, servers and personal computers, respectively, but the principles of the present disclosure are not so limited. Embodiments of the present disclosure find application, among others, with set-top boxes, TVs, computers (both desktop and laptop computers), tablet computers, computer servers, media players and/or dedicated video conferencing and entertainment equipment, among others.

The network 150 represents any number of networks that convey coded video data between the terminals 110-140, including, for example, wireline and/or wireless communication networks. The communication network 150 may exchange data in circuit-switched or packet-switched channels. Representative networks include telecommunications networks, local area networks, wide area networks and/or the Internet. For the purposes of the present discussion, the architecture and topology of the network 150 are immaterial to the operation of the present disclosure unless otherwise noted.

Figure 2:
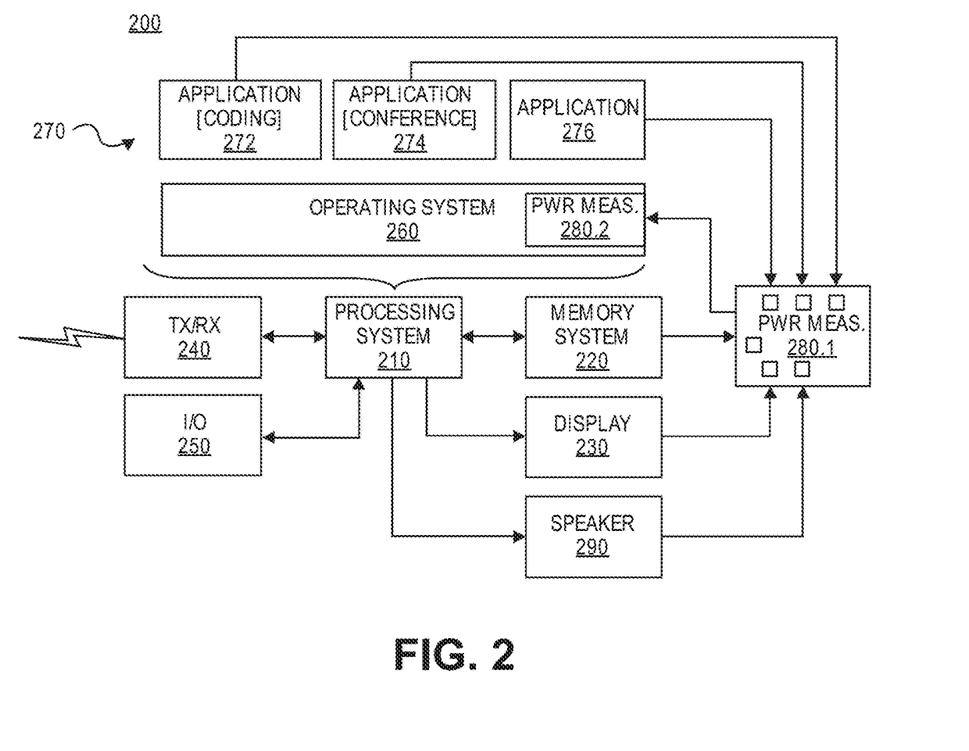
FIG. 2 illustrates a functional block diagram of a terminal according to an embodiment of the present disclosure.

FIG. 2 is a functional block diagram of a terminal 200 according to an embodiment of the present disclosure. The terminal 200 may include a processing system 210, memory system 220, display 230, speaker 290, transceiver (TX/RX) 240, input/output (I/O) units 250, and a power measurement unit 280 (shown as 280.1, 280.2 in FIG. 2).

The processing system 210 may control operation of the terminal 200 by causing the terminal 200 to interact with other entities, such as those illustrated in FIG. 1, to accurately measure power consumption. The memory system 220 may store instructions that the processing system 210 may execute and also may store application data 220 generated therefrom. The architecture of the processing system 210 may vary from terminal to terminal. Typically, the processing system 210 will include a central processing unit; it also may include graphics processors, digital signal processors and application specific integrated circuits (not shown) as may be suitable for individual application needs. The architecture of the memory system 220 also may vary from terminal to terminal. Typically, the memory system 220 will include one or more electrical, optical and/or magnetic storage devices (also not shown). The memory system 220 may be distributed throughout the processing system. For example, the memory system may include a cache memory provided on a common integrated circuit with a central processor of the processing system 210. The memory system 220 also may include a random access main memory coupled to the processing system 210 via a memory controller and it also may include non-volatile memory device(s) for long term storage. The memory system 220 may also be a non-transitory computer-readable medium.

The processing system 210 may execute a variety of programs during operation, including an operating system 260 and one or more application programs 270. For example, as illustrated in FIG. 2, the terminal 200 may execute a media coding application 272, a conferencing application 274, along with possibly other applications. The media coding application 272 may manage download, encoding, decoding, and output of media items. The media coding application 272 may code input video data according to a variety of different coding techniques to achieve bandwidth compression, e.g., according to coding protocols defined by ITU H.263, H.264, H.265 and the like. The conferencing application 274 may support conferencing exchange between the terminal 200 and another terminal (not shown) as discussed.

The power measurement unit 280 may be implemented as hardware, software, or a combination, and may act as a control unit. For example, a component of the power measurement unit 280.1 may be implemented as hardware including sensors for measuring various components of the terminal 200. For example, the power measurement unit 280.1 may be connected to a supply voltage of the display 230 or other circuitry of the display 230. Another component of the power measurement unit 280.2 may be implemented as software and include routines to manage measurements of various components of the terminal 200.

In an embodiment, the power measurement unit 280 may measure all sorts of processes in the system. For example, different test vectors may test different aspects of the system, such as the display 230, general performance of the processing system 210, the coding application 272, the speaker 290, etc. The power measurement unit 280 may measure how much power is consumed by a particular process, determine a level of accuracy of a power consumption measurement, and/or remove noise from a power consumption measurement. For example, power measurement unit 280 may measure a voltage or load of the display 230 or the speaker 290, analyze caching behavior of the memory system 220, determine a time that the coding application 272 takes to decode a media segment, and/or determine other indicators of power consumption, as discussed herein. In an embodiment, the power measurement unit 280 may measure and analyze several indicators in parallel to make a determination of power consumption of various components of the system.

The components of the terminal 200 may report to the power measurement unit 280 information such as thermal characteristics, temperature, time to perform a task on a unit of information (e.g., a frame, block, macroblock), and the like.

The information measured by the power measurement unit 280 may be internal or external to the terminal 200. The information may be used to make decisions about the terminal's behavior, which may increase or decrease power consumption. In an embodiment, the measurements may be used to dynamically alter the behavior of the terminal 200. In another embodiment, the measurement may be stored for future use.

In an embodiment, a "global" probe may obtain information of the individual aspects of the system. For example the global probe may be implemented as an array of sensors. The global probe may obtain information about the processing system 210. The global probe may collect targeted results with M vectors that test M different aspects of the system, with N repetitions and K intervals each. The global probe may then provide the results to the power measurement unit 280. The power measurement unit 280 may then perform an analysis and optimization process on the overall collected data, and based on each process, the method may derive characteristics of individual components (e.g., the operating system 260, the coding application 272, the conferencing application 274, and other applications 276) based on the global probe. For example, the global probe may obtain a thermal measurement, a voltage measurement, and a current measurement of a component and synchronize the measurements based on a timing reference to determine a characteristic of the component from the measurements.

The methods and systems described herein find application, among others, in a process that: repeats and is measured once per instance; and measurement of the process suffers noise or interference that generally increases (or generally decreases) the measurement.

For processes exhibiting these characteristics, an estimate of a noise-free signal may be obtained by running multiple instances, obtaining multiple measurements, and using the minimum of the measurements as the best estimate of the measurement with noise removed.

If the noise or interference has quiet periods that sometimes exceed the duration of one instance of the process, the measurement may suffer no interference and thus may give a noise-free signal. If the interference varies (including periodically, as long as the period differs from the process duration) then varying measurements may be expected. In this case, a noise-free signal may be estimated by determining the minimum of the measurements.

General Case 1

Figure 3A:
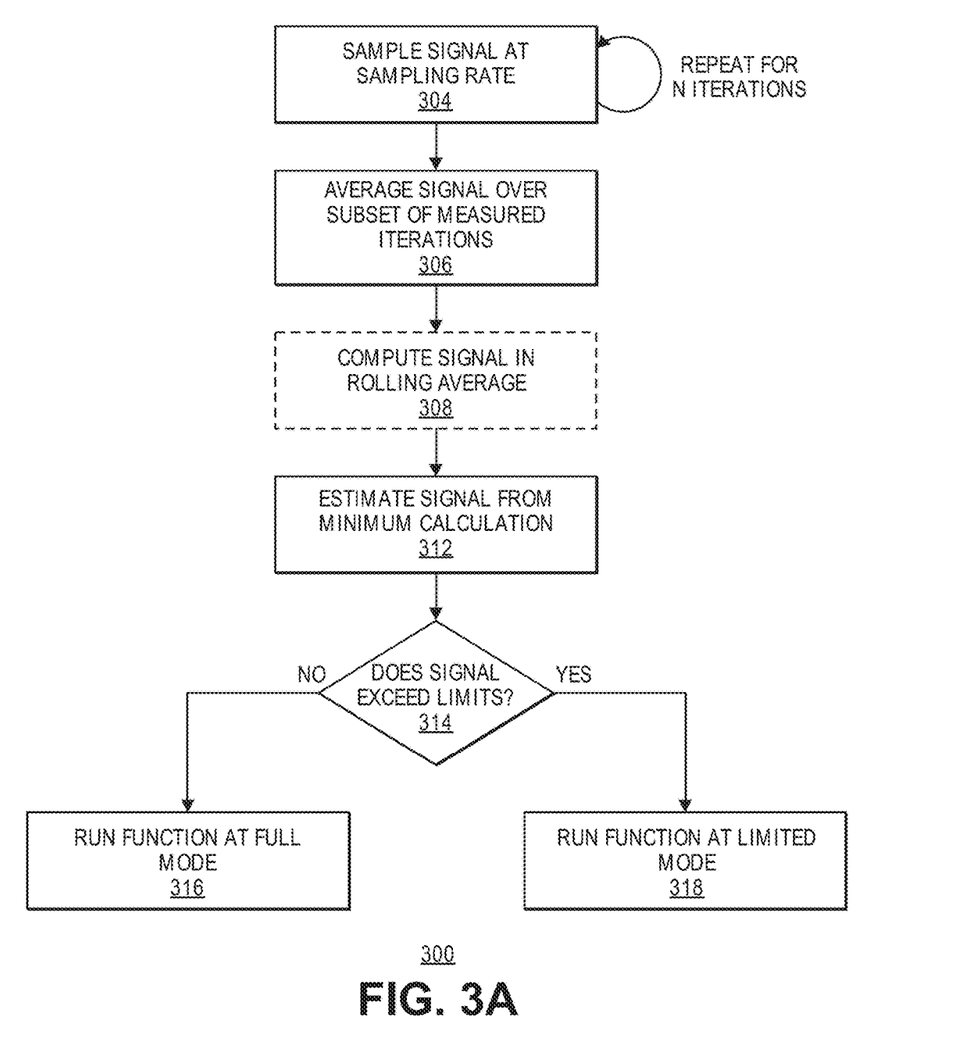
FIG. 3A illustrates a flowchart representing a method according to embodiments of the present disclosure.

FIG. 3A is a flowchart illustrating a method 300 according to embodiments of the present disclosure. The method 300 finds application, among others, in measurements of: a repeating process, with relatively many synchronous samples during each instance of the process, having expected noise with a substantially constant sign. The process may be repeated for N iterations.

In an embodiment, the method 300 may measure the process ("a signal" in FIG. 3A) at a given sampling rate (box 304). In an embodiment, the method 300 may take F samples during a single instance of the process. The measurements made by method 300 may be represented as $X(i)$, where $i$ runs from 0 to $N*F-1$. The method 300 may average the first F samples (box 306). For example, the method 300 may average as follows:

$$S(0)=\text{Sum}\{X(0) \ldots X(F-1)\},$$

$$S(1)=\text{Sum}\{X(1) \ldots X(F)\},$$

$$S(2)=\text{Sum}\{X(2) \ldots X(F+1)\},$$

$$S(3)=\text{Sum}\{X(3) \ldots X(F-2)\},$$

$$S((N-1)F)=\text{Sum}\{X((N-1)F) \ldots X(NF-2)\},$$

$$S((N-1)F+1)=\text{Sum}\{X((N-1)F+1) \ldots X(NF-1)\}.$$

Figure 4:
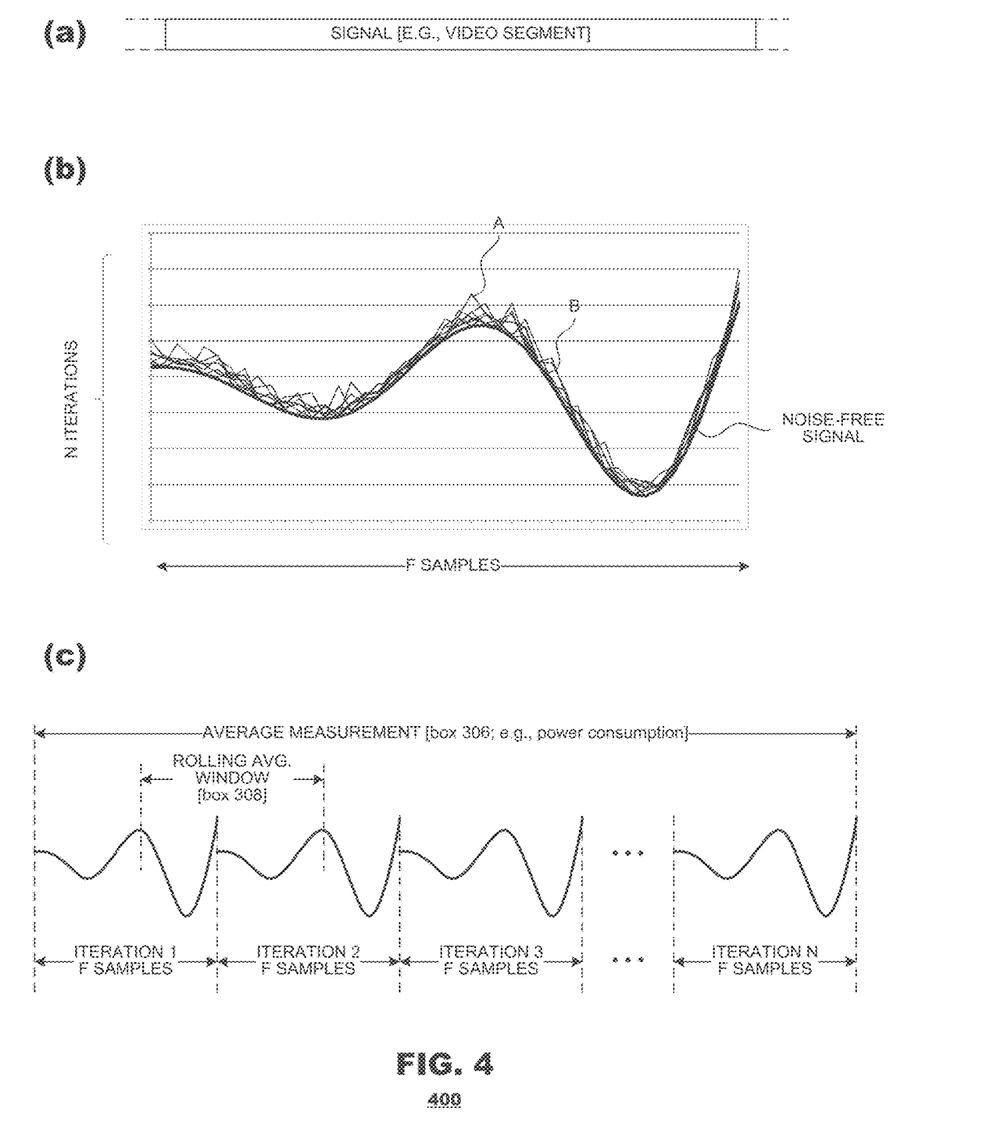
FIG. 4 illustrates a conceptual diagram of (a) a signal, (b) multiple iterations of measurements, and (c) an average measurement obtained from multiple iterations of the measurement, according to an embodiment of the present disclosure.

Using the example of FIG. 4(c), the process is repeated N times. The method 300 may take F samples in Iteration 1, F samples in Iteration 2, and so on.

The method 300 may estimate a noise-free value of the signal by taking a minimum (box 312). For example, the minimum may be taken of $S(i)$ over $0 \leq i \leq (N-1)F+1$. In an embodiment, if errors are expected to be positive, an estimated noise-free value of the signal may be derived from the minimum. In an alternative embodiment (not shown), the maximum may be taken of $S(i)$ over $0 \leq i \leq (N-1)F+1$. If the errors are expected to be negative, an estimated noise-free value of the signal may be derived from the maximum.

In an embodiment, the method 300 may further compute the signal in a rolling average (box 308). For example, the method may repeat the averaging (box 306) over a rolling window through the repetition. Referring to FIG. 4(c), the method 300 may make the average measurement using a rolling average window. The rolling average window may be defined in terms of a unit of measurement, e.g., time in the case of decoding a time segment. The rolling average window may be used to obtain an average of samples with begin and end times that do not necessarily align with the duration of a single instance of a measurement.

The rolling window may be applied to find the minimum value, which will be the interval in which the least noise was injected. This is because for a noise process that is zero for most samples, but relatively large and positive for a random few samples, the method may identify noise by finding a set of samples that avoids all the noise samples. However, it may be unknown which samples would constitute the set, and it may unknown how many (or how dense) the noise samples are. By averaging over a rolling window equal to the number of samples in a process instance, each sampling time in the process is counted equally (e.g., just once). Because the process repeats, averaging the last Q samples of one instance and the first F-Q samples of the succeeding instance is equivalent to averaging over a single instance. In an embodiment, computational complexity of this rolling window process may include 3NF+constant operations and a constant number of samples for storage.

In an embodiment, in box 306, the method may instead determine a sum, a sum of squares, a mean of squares, an RMS, or other summary statistic. A noise-free value of the signal may be derived from the minimum or maximum of each of these quantities.

In another embodiment, the method 300 may observe a sample distribution of power averages and extrapolate that distribution to an unobserved minimum asymptote in step 312 to estimate a noise-free value of the signal.

Early Termination Criteria

In an embodiment, the method 300 may be optimized by tracking a minimum sum observed so far. The method 300 may stop adding to the current sum when the sum exceeds a tracked minimum. In another aspect, the method 300 may consider "early" termination criteria for a window evaluation. For example, if the current window exceeds the current minimum before accumulating N samples, the method may terminate.

Optimization

In an embodiment, the method 300 may optimize the computation of the S(x) windows. For example, it may be known or expected that the current window, S(x), differs from the previous window by 2 samples. That is, it may be known or expected that the first sample is introduced in S(x−1) and the new sample that is introduced in S(x). The method 300 may then compute the total of S(x) by subtracting one value (the first in S(x−1) that is no more in S(x), and by adding the new value that just was added into the window. In other words, the sums after the first one, S(0), can be computed relatively cheaply, since S(k+1)=S(k)−X(k)+X(k+F).

Handling Periodic Noise

In an embodiment, if "noise" is periodic, e.g., happens at the same time slots, the method 300 may be modified to track a value per time slot, e.g., the "delta" between the lowest value and a currently measured one. If that delta is "large", the method 300 will determine that this is potentially in a "noise" region. The method 300 may then discard that measurement from the set.

General Case 2: "Per-Sample Minimum"

In an embodiment, in box 306, the method 300 may obtain an average based on minimizing each sample position separately (rather than summing, then choosing the minimum sum as in general case 1 discussed above). In some instances, the minimum per sample may be less contaminated by noise from other components. The method 300 may minimize each sample position as follows:

$$S(0) = \min X(0), X(F), X(2F), X(3F), \ldots X((N-1)F)$$
$$S(1) = \min X(1), X(F+1), X(2F+1),$$
$$X(3F+1), \ldots ((N-1)F+1)$$
$$\ldots$$
$$S(j) = \min X(j), X(F+j), X(2F+j),$$
$$X(3F+j), \ldots X((N-1)F+j) \text{ for } 0 \le j \le F-1$$

1. Then the result is

Sum $\{S(k), 0 \le k \le N\}$ or the corresponding average, mean square, or chosen statistic.

In an embodiment, this variation of the method can take advantage of brief intervals, down to a single sample, when the interference is absent.

In an alternative embodiment, the method 300 may create smaller subsets (e.g. {X(i*n+0), X(i*n+1), X(i*n+2), X(i*n+3)} {X(i*n+4),X(i*n+5),X(i*n+6),X(i*n+7)}, etc, and minimizing across these sets (find the i for each subset that has the smallest distortion). There could be an advantage of using this, especially in a realtime system, since doing so could reduce memory and the number of comparisons. The sets may be, but need not be, of the same size. For example, if a particular process is expected to take place during a particular interval, the method may use a bigger window for that process.

In an embodiment, the computational complexity of a per-sample-minimum process may be F log N+log F+constant and use constant number of samples for storage. In another embodiment, the computational complexity of a per-sample-minimum process may be 2(N−1)F+log F+constant and use F samples+constant for storage.

Example Embodiment: Video Decoding—Power

Figure 3B:
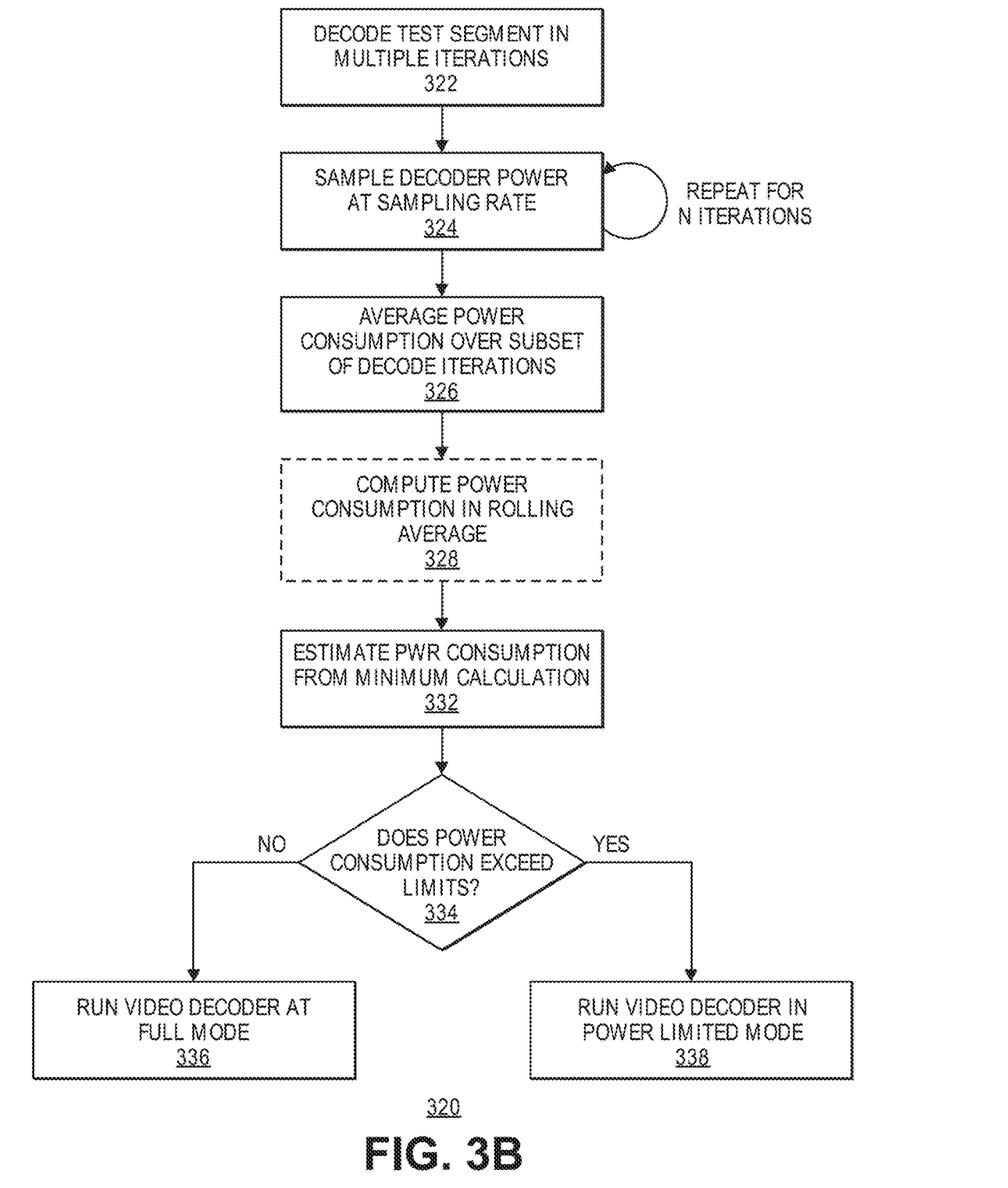
FIG. 3B illustrates a flowchart representing a method according to an embodiment of the present disclosure.

FIG. 3B is a flowchart illustrating a method 320 according to an embodiment of the present disclosure. The method 320 may determine processing needs based on video decoding characteristics. For example, the method 320 may measure power drain for video decoding. In one aspect, the method 320 may measure a signal and filter noise out of the signal based on a pattern. For example, the method 320 may measure power consumption and determine the components of power consumption that are due to video decoding (and not other system activities).

In an embodiment, the method 320 may:

decode a test segment in multiple iterations, e.g., repeat decoding of a common video clip of predetermined length numerous times (e.g., 10-second) (box 322);

take power samples at a predetermined sampling rate (e.g., 10 kHz) (box 324);

average the power samples over the clip's duration seconds (100,000 samples) (box 326);

optionally repeat the averaging over a rolling 10-second window through the repeats (box 328);

choose the minimum value of these averages to determine power consumption due to video decoding (also referred to as the "noise-free signal") (box 332);

run a video decoder at a full power mode, if the power consumption is below a predefined threshold (box 336), or, run the video decoder at a power limited mode, if the power consumption is above the threshold (box 338).

FIG. 4 is a conceptual diagram of (a) a signal, (b) multiple iterations of measurements, and (c) an average measurement obtained from multiple iterations of the measurement, according to an embodiment of the present disclosure. For example, the signal may be a video segment and the measurement may be a measure of power consumption associated with decoding the video segment.

FIG. 4(a) shows a single instance of the signal, which may be transmitted over a channel. FIG. 4(b) shows N iterations of measurements with F samples each. FIG. 4(b) shows a noise-free signal, which is the signal without any noise. In practice, a noise-free signal cannot be measured directly because a measured signal typically includes noise. However, a noise-free value of a signal may be derived according to the methods and systems described herein.

Each curve shown in FIG. 4(b) represents a measurement. Each curve is obtained by taking F samples. Each iteration may include other noises. Sometimes a measurement iteration may include a substantial level of noise and may deviate substantially from the noise-free signal. For example, iteration "A" shown in FIG. 4(b) may include a substantial amount of outside noise. Other measurements may be closer to the noise-free signal. For example, the iteration "B" shown in FIG. 4(b) may include less noise compared with iteration "A". One or more of the iterations may be analyzed to remove noise and thus derive the "true" signal according to the methods and systems described herein. For example, the method 300 may be applied to the signal shown in FIG. 4(a) or to an associated signal to estimate a noise-free value of the signal or the associated signal.

In an embodiment, noise or "unintended power" in a power consumption measurement generally shows up as positive because power has an absolute zero. Thus, the method 320 may use a minimum over the repeats or some other statistic to estimate a noise-free value of the signal In an alternative embodiment, if the noise is expected to always be negative (e.g., drop-outs of some sort), the method 320 may use a maximum over the repeats or some other statistic to estimate a noise-free value of the signal.

In an embodiment, the method 320 may include spatial filtering or spatiotemporal filtering. For example, the method 320 may apply denoise or low pass filtering while decoding the test segment (box 322). The method 320 may filter a particular position based on its spatial neighbors. The spatial filtering may be implemented by an FIR filter a Wiener filter, and the like.

Example Embodiment: Video Decoding—Time

Figure 3C:
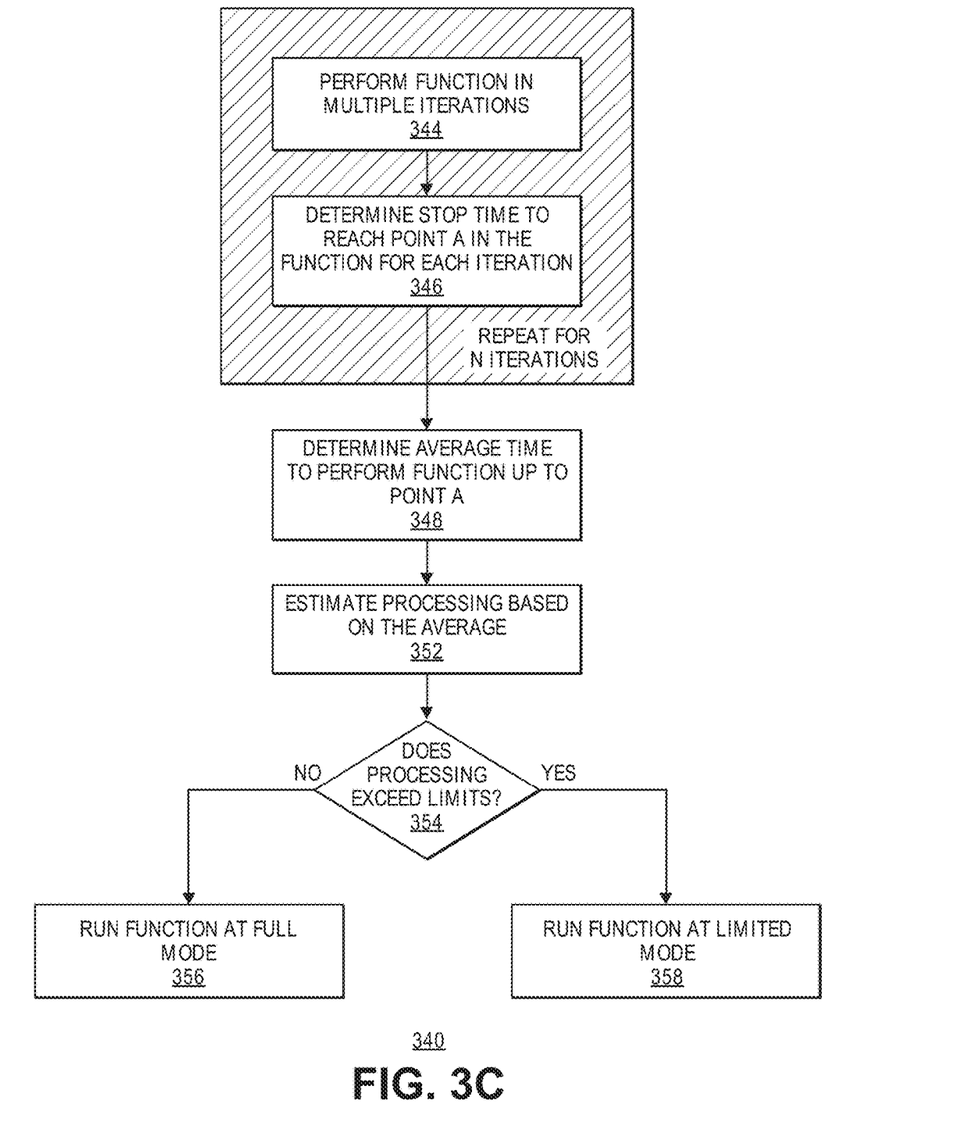
FIG. 3C illustrates a flowchart representing a method according to an embodiment of the present disclosure.

FIG. 3C is a flowchart illustrating a method 340 according to an embodiment of the present disclosure. The method 340 may determine processing needs based on video decoding characteristics. For example, the method 340 may measure a time to perform a function for video decoding. In one aspect, the method 340 measure a signal and filter noise out of the signal based on a pattern. For example, the method 340 may measure a stop time to reach a particular point in a video decoding process and determine processing due to video decoding (and not other system activities).

In an embodiment, the method 340 may:
perform a function in multiple iterations, e.g., repeat decoding of a common video clip of predetermined length numerous times (e.g., 10-second) (box 344);
determine a stop time to reach a particular point ("point A") in the function for each iteration (box 346); the time to reach the same point in each iteration may vary due to other system processes;
average the time to perform the function up to point A (box 348);
optionally repeat the averaging over a rolling 10-second window through the repeats (not shown);
choose the minimum value of these averages to determine processing of the video decoding (also referred to as the "noise-free signal") (box 352);
run a video decoder at a full mode, if the processing is below a predefined threshold (box 356), or, run the video decoder at a limited mode, if the processing is above the threshold to reduce processing requirements (box 338).

Subsampling

Subsampling may be incorporated into the methods described herein. Subsampling may reduce computational complexity.

In an embodiment, when applying the rolling-window approach (e.g., box 308 shown in FIG. 3A), the method 300 may skip samples between the ones used for calculation. For example, the method 300 may be performed for a selected value M such that the measurement rate is reduced from F samples per instance to F/M samples. If M divides F evenly, the method 300 may be performed for the selected measurement samples, while skipping the other samples. If M does not divide F evenly, the method 300 may adjust the sub-sampling phase at the boundary between instances so that the method uses the same position in each instance for computation.

In an embodiment, when applying the per-sample-minimum process (e.g., "General Case 2" discussed above), the method 300 may skip samples between the ones used for calculation. For example, if the skip ratio does not divide F, the method 300 may adjust the instance boundaries so that the method uses the same position in each instance for computation.

In an embodiment, the method 300 may measure a minimum power usage. For example, the method 300 may measure the power consumption in an "idle" mode, i.e. a mode in which the device is on but the operation of interest is not running. The measurements of the power consumption due to decoding described herein may then be considered with respect to the minimum power usage, i.e. X−Y, where X is the power consumption measurement and Y is that minimum power usage.

In an embodiment, the method 300 may perform a sub-sampled search to improve speed. For example, a "good" enough value (instead of a "best" value) may be worth the speed improvement. For example, the method 300 may "skip" every M samples and compute the sum for windows $S(i)$ through $S(i+k*M)$.

In yet another embodiment, the method 300 may find a $S(i+j*M)$ window, then further refine by performing a search around the window. The method may consider not just at the best j value but the x best values (to avoid or reduce the probability of becoming trapped within local minima). Another alternative is to subsample not the windows but the values themselves.

In yet another embodiment, the method 300 may perform "sub-interval minimization". Sub-interval minimization may be a hybrid between play-duration rolling window and per-sample minimization. The method 300 may synthesize rolling windows for sub-sequences of a full sample to improve a chance of missing noise spikes while lowering cost compared with per-sample minimization.

Power Measurements Using De-Noising Strategies

Because collection of the power measurements and the desired operation may be asynchronous, a sync detection (i.e. the first peak or a detection of an increase in power consumption) after the power collection is commonly performed, which can complicate data collection. Furthermore, the averaging process, although it may provide a smoothing for the power involved for the process of interest, also includes power consumed by other operations, which can vary substantially. Averaging may reduce the peaks for such operations, but will not eliminate them, especially since the impact from these processes is essentially additive (with a positive sign). Percentiles may work a bit better by removing peaks but again will not eliminate the effect from such unrelated operations.

Embodiments of the present disclosure provide for measurement collection that may be performed as a single measurement using a test sample that is generated as the concatenation of N times an original test sample. Such measurement collections may eliminate the need to synchronize several separate measurement processes to detect the beginning of the tested sample. As long as the duration of the original test sample is known, e.g. $t_{dur}$, measurements could be collected and analyzed from any point at which it is known that the desired operation is taking place. Given the periodicity of the concatenated test sample any window of length $t_{dur}$ should basically contain the power information relating to the decoding of the original test sample. This process also has the added benefit that it removes the effect of caching that could occur when using a single test sample. There are several alternative solutions that can provide reliable measurements for the power characteristics of a particular system.

Window Minimization—Static and Rolling Windows

Figure 5:
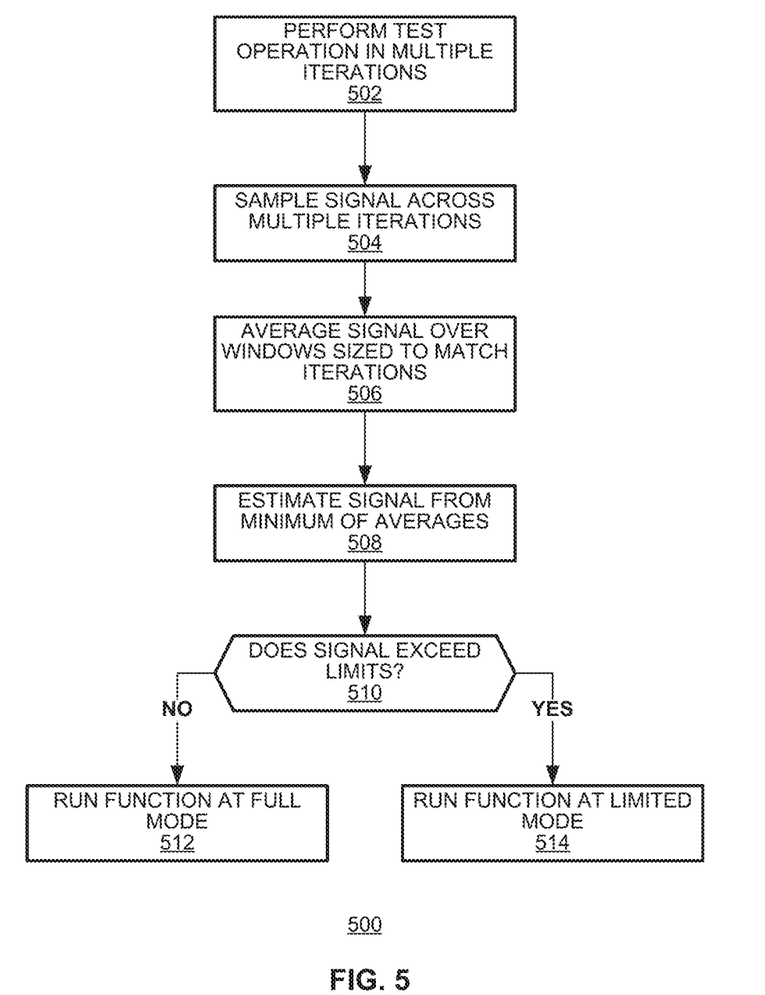
FIG. 5 illustrates a method of signal denoising with windows according to an embodiment of the present disclosure.

FIG. 5 illustrates a method 500 of signal denoising with windows according to an embodiment of the present disclosure. The method 500 may find the minimum result and use that measurement to characterize the power performance of a particular system. The method 500 may perform an operation to be tested in multiple iterations (box 502). The method 500 may sample a signal to be denoised across the multiple iterations (box 504). The measured signal may be averaged in a plurality of sample windows that are sized to match the duration of a single iteration of the tested operation (box 506). The denoised signal may be estimated from a minimum of the average values (box 508). The method 500 may determine whether the estimated signal exceeds a predetermined limit (box 510). If so, the decoding function may be run at a limited power mode (box 514). If not, the decoding function may be run at a full power mode (box 512).

Figure 6:
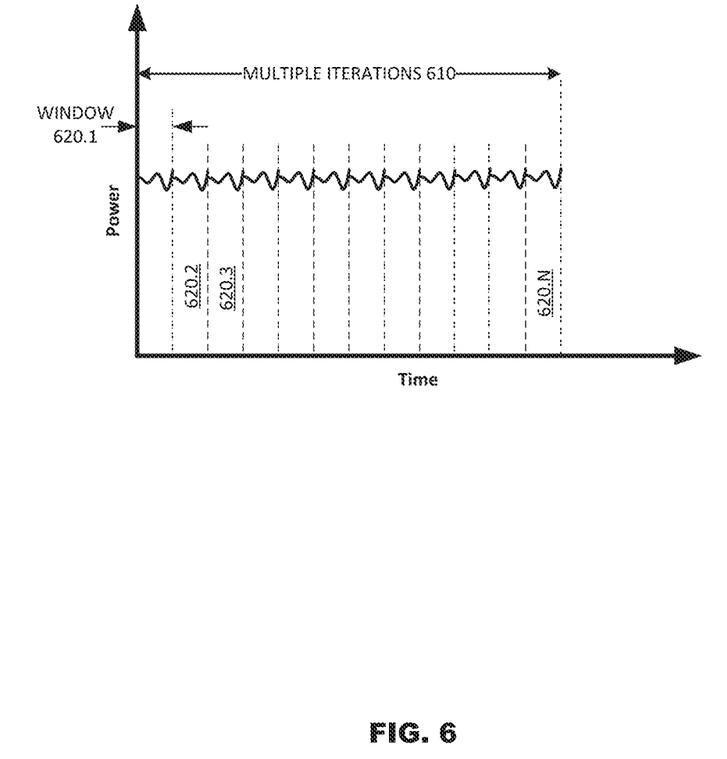
FIG. 6 illustrates multiple iterations of the signal, according to an embodiment of the present disclosure.

FIG. 6 illustrates operation of the method of FIG. 5 in the context of an exemplary signal being denoised. As illustrated, the tested operation may be performed in multiple operations shown over the interval 610. Averaging operations may be performed in many windows 620.1-620.N that are sized to match the duration of a single iteration of the tested operation.

Although permissible, the method of FIG. 5 does not require that the onset and termination of individual windows 620.1-620.N align to the onset and termination of individual iterations of the tested operation. Thus, there is no need to synchronize the sampling windows to the timing of the different iterations of tested operations. In practice, it may be convenient to perform averaging over a small number of windows that will fill the entire interval duration 610 (e.g., perform N-1 averaging operation for a signal interval that accommodates N iterations) to simplify calculations.

Additionally, the method of FIG. 5 accommodates use of rolling window averaging as discussed in the earlier embodiments. The rolling window could use a "transition" step dL equal to the size of the actual sampling process. However, different power measurement systems may operate sampling at different rates (e.g. <1 ms) and also at very high precision, which can lead to very inaccurate and noisy individual samples. Therefore, the method could use a rolling window with a step size that spans across multiple sampling intervals, ideally capturing information about one or more distinct units that may exist in the data. For example, for video decoding, the method can consider slices, pictures, or Groups of Pictures (GOPs) as distinct units, and then consider their presentation time when selecting the rolling window step size. In a particular example, the method could use a step size equivalent to the presentation time of ten pictures, or any other number of pictures.

Absolute Sample Minimum

In another embodiment, averaging may occur over a plurality of sub-windows and a denoised signal may be derived from a minimum value of sub-windows from different iterations of the tested operation.

Figure 7:
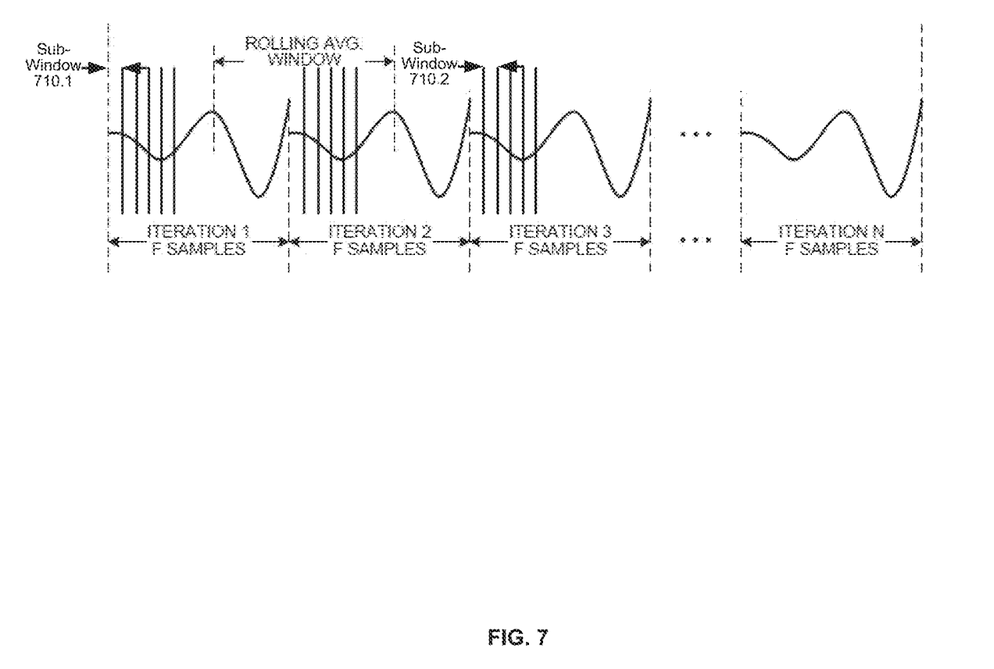
FIG. 7 illustrates the use of sub-windows according to an embodiment of the present disclosure.

FIG. 7 illustrates exemplary use of sub-windows according to an aspect of the present disclosure. In this embodiment, samples obtained from each iteration of a tested method may be parsed in into smaller regions 710.1, 720.1 of, commonly, equal size. That is, each window i of size L could be split to K sub-windows 710 ($w_{i,j}$) having size L/K. For each iteration, there will be a first sub-window, a second sub-window and a Kth sub-window, each of which contains samples from a co-located portion of the test operation. The method can then apply the minimization process on every window $j_i$ with i from 0 to K-1, to determine the minimum of each segment. Then, the method can compute an estimate of the power consumption for a particular scheme as:

$$\text{power\_overall} = \sum_{j=0}^{K-1} \min_i (\text{power}(w_{i,j}))$$

Similar to the rolling window minimization approach, the size of the sub-windows 710 may be large enough so as to contain one or more distinct coding units, for example slices, pictures, or Groups of Pictures (GOPs). The coding units may refer to a particular aspect of the encoding. For example, a hierarchical GOP, an Intra Period GOP, N consecutive frames (with N being even 1), or even a subframe (slice, tile, M number of macroblocks decoded serially), assuming these are done serially, can be considered as some form of a coding unit. Sub-windows may contain one or more of such coding units (what is the minimum time a decoder requires to decode such information) for the results to be somewhat meaningful and not impacted by noise.

General Implementation Details

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims. For example, embodiments of the present invention may provide a method of coding; a non-transitory computer readable medium storing program instructions that, when executed by a processing device, causes the device to perform one or more of the methods described herein; a video coder, etc.

The techniques described herein may be implemented by executing instructions on a computer-readable medium, wherein the "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments, which may operate in accordance with one or more particular standards and protocols. However, the disclosure is not limited to such standards and protocols. Such standards periodically may be superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that remove noise from a measurement. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

We claim:

1. A method, comprising:
sampling a signal from a sensor measuring a resource over a plurality of iterations of a common process that consumes the resource;
identifying a minimum value of co-located samples from among the plurality of iterations;
estimating a noise-free value of the signal at each sample position based at least in part on the minimum value of co-located samples obtained at a respective position from among the plurality of iterations; and
controlling a level of consumption of the resource based on the estimated noise-free value.

2. The method of claim 1, wherein the signal is provided by a sensor within a device.

3. The method of claim 1, wherein the signal is provided by a sensor external to a device.

4. The method of claim 1, further comprising:
determining whether the estimated noise-free value of the signal is within a predetermined limit;
in accordance with a determination that the estimated noise-free value is within the predetermined limit, performing the method in a full power mode; and
in accordance with a determination that the estimated noise-free value is not within the predetermined limit, performing the method in a power conserved mode.

5. The method of claim 1, further comprising:
determining whether the estimated noise-free value of the signal is within a predetermined limit;
in accordance with a determination that the estimated noise-free value is within the predetermined limit, increasing a power consumption limit of a device; and
in accordance with a determination that the estimated noise-free value is not within the predetermined limit, decreasing the power consumption limit of the device.

6. The method of claim 1, wherein the resource is electrical power.

7. The method of claim 1, further comprising:
estimating a power consumption from the noise-free value.

8. An apparatus, comprising:
a processor;
a memory system, in communication with the processor;
a power distribution system, coupled to the processor and the memory system;
a power measurement sensor coupled to the power distribution system; and
a control system coupled to receive an output of the power measurement sensor and configured to control power consumption within the apparatus by:
sampling the output of the power measurement sensor over a plurality of iterations;
identifying a minimum value of co-located samples from among the plurality of iterations;
estimating a noise-free value of the power measurement sensor output at each sample position based at least in part on the minimum value of co-located samples obtained at a respective position from among the plurality of iterations; and
controlling a level of the power consumption based on the estimated noise-free value.

9. The apparatus of claim 8, wherein the control system is further configured to control power consumption within the apparatus by:
determining whether the estimated noise-free value of the power measurement sensor output is within a predetermined limit;
in accordance with a determination that the estimated noise-free value is within the predetermined limit, performing the method in a full power mode; and
in accordance with a determination that the estimated noise-free value is not within the predetermined limit, performing the method in a power conserved mode.

10. The apparatus of claim 8, wherein the control system is further configured to control power consumption within the apparatus by:
determining whether the estimated noise-free value of the power measurement sensor output is within a predetermined limit;
in accordance with a determination that the estimated noise-free value is within the predetermined limit, increasing a power consumption limit of a device; and
in accordance with a determination that the estimated noise-free value is not within the predetermined limit, decreasing the power consumption limit of the device.

11. A non-transitory computer readable medium containing program instructions for causing a computer to perform a method of:
sampling a signal from a sensor measuring a resource over a plurality of iterations of a common process that consumes the resource;
identifying a minimum value of co-located samples from among the plurality of iterations;

estimating a noise-free value of the signal at each sample position based at least in part on the minimum value of co-located samples obtained at a respective position from among the plurality of iterations; and controlling a level of consumption of the resource based on the estimated noise-free value.

12. The medium of claim 11, wherein the signal is provided by a sensor within a device.

13. The medium of claim 11, wherein the signal is provided by a sensor external to a device.

14. The medium of claim 11, the method further comprising:
determining whether the estimated noise-free value of the signal is within a predetermined limit;
in accordance with a determination that the estimated noise-free value is within the predetermined limit, performing the method in a full power mode; and
in accordance with a determination that the estimated noise-free value is not within the predetermined limit, performing the method in a power conserved mode.

15. The medium of claim 11, the method further comprising:
determining whether the estimated noise-free value of the signal is within a predetermined limit;
in accordance with a determination that the estimated noise-free value is within the predetermined limit, increasing a power consumption limit of a device; and
in accordance with a determination that the estimated noise-free value is not within the predetermined limit, decreasing the power consumption limit of the device.

16. A method, comprising:
sampling a signal from a sensor measuring a resource over a plurality of iterations of a common process that consumes the resource;
identifying, for each iteration, a minimum value within a window of a predetermined sample width and comprising sub-windows by determining a minimum value of each sub-window within the window for each iteration;
estimating a noise-free value of the signal based at least in part on the minimum value of co-located samples obtained in each sub-window for the plurality of iterations; and
controlling a level of consumption of the resource based on the estimated noise-free value.

17. The method of claim 16, wherein the signal is provided by a sensor within a device.

18. The method of claim 16, wherein the signal is provided by a sensor external to a device.

19. The method of claim 16, further comprising:
determining whether the estimated noise-free value of the signal is within a predetermined limit;
in accordance with a determination that the estimated noise-free value is within the predetermined limit, performing the method in a full power mode; and
in accordance with a determination that the estimated noise-free value is not within the predetermined limit, performing the method in a power conserved mode.

20. The method of claim 16, further comprising:
determining whether the estimated noise-free value of the sampled signal is within a predetermined limit;
in accordance with a determination that the estimated noise-free value is within the predetermined limit, increasing a power consumption limit of a device; and
in accordance with a determination that the estimated noise-free value is not within the predetermined limit, decreasing the power consumption limit of the device.

21. The method of claim 16, wherein the resource is electrical power.

22. The method of claim 16, further comprising:
estimating a power consumption from the noise-free minimum value.

23. An apparatus, comprising:
a processor;
a memory system, in communication with the processor;
a power distribution system, coupled to the processor and the memory system;
a power measurement sensor coupled to the power distribution system; and
a control system coupled to receive an output of the power measurement sensor and configured to control power consumption within the apparatus by:
sampling a common signal over a plurality of iterations;
identifying, for each iteration, a minimum value within a window of a predetermined sample width and comprising sub-windows by determining a minimum value of each sub-window within the window for each iteration; and
estimating a noise-free value of the common signal based at least in part on the minimum value of co-located samples obtained in each sub-window for the plurality of iterations.

24. The apparatus of claim 23, wherein the control system is further configured to control power consumption within the apparatus by:
determining whether the estimated noise-free value of the power measurement sensor output is within a predetermined limit;
in accordance with a determination that the estimated noise-free value is within the predetermined limit, performing the method in a full power mode; and
in accordance with a determination that the estimated noise-free value is not within the predetermined limit, performing the method in a power conserved mode.

25. The apparatus of claim 23, wherein the control system is further configured to control power consumption within the apparatus by:
determining whether the estimated noise-free value of the power measurement sensor output is within a predetermined limit;
in accordance with a determination that the estimated noise-free value is within the predetermined limit, increasing a power consumption limit of a device; and
in accordance with a determination that the estimated noise-free value is not within the predetermined limit, decreasing the power consumption limit of the device.

26. A non-transitory computer readable medium containing program instructions for causing a computer to perform a method of:
sampling a signal from a sensor measuring a resource over a plurality of iterations of a common process that consumes the resource;
identifying, for each iteration, a minimum value within a window of a predetermined sample width and comprising sub-windows by determining a minimum value of each sub-window within the window for each iteration;
estimating a noise-free value of the signal based at least in part on the minimum value of co-located samples obtained in each sub-window for the plurality of iterations; and
controlling a level of consumption of the resource based on the estimated noise-free value.

27. The medium of claim 26, wherein the signal is provided by a sensor within a device.

28. The medium of claim 26, wherein the signal is provided by a sensor external to a device.

29. The medium of claim 26, the method further comprising:
   determining whether the estimated noise-free value of the signal is within a predetermined limit;
   in accordance with a determination that the estimated noise-free value is within the predetermined limit, performing the method in a full power mode; and
   in accordance with a determination that the estimated noise-free value is not within the predetermined limit, performing the method in a power conserved mode.

30. The medium of claim 26, the method further comprising:
   determining whether the estimated noise-free value of the signal is within a predetermined limit;
   in accordance with a determination that the estimated noise-free value is within the predetermined limit, increasing a power consumption limit of a device; and
   in accordance with a determination that the estimated noise-free value is not within the predetermined limit, decreasing the power consumption limit of the device.

* * * * *